US011641417B2

(12) United States Patent
Cooper et al.

(10) Patent No.: US 11,641,417 B2
(45) Date of Patent: May 2, 2023

(54) GRIP AND SUPPORT ATTACHMENT FOR HANDHELD ELECTRONIC DEVICES

(71) Applicant: Push Product Design, LLC, Birmingham, AL (US)

(72) Inventors: Lloyd Cooper, Birmingham, AL (US); Foster Phillips, Birmingham, AL (US); Austin Gurley, Birmingham, AL (US)

(73) Assignee: Push Product Design, LLC, Birmingham, AL (US)

( * ) Notice: Subject to any disclaimer, the term of this patent is extended or adjusted under 35 U.S.C. 154(b) by 330 days.

(21) Appl. No.: 17/003,358

(22) Filed: Aug. 26, 2020

(65) Prior Publication Data

US 2022/0070286 A1  Mar. 3, 2022

(51) Int. Cl.
*H04M 1/04* (2006.01)
*F16M 13/00* (2006.01)
*F16M 11/10* (2006.01)
*F16M 11/38* (2006.01)
*G06F 1/16* (2006.01)

(52) U.S. Cl.
CPC .............. *H04M 1/04* (2013.01); *F16M 11/10* (2013.01); *F16M 11/38* (2013.01); *F16M 13/005* (2013.01); *G06F 1/1626* (2013.01)

(58) Field of Classification Search
CPC ...................................................... H04M 1/04
See application file for complete search history.

(56) References Cited

U.S. PATENT DOCUMENTS

| 8,844,098 | B2 | 9/2014 | Karmatz | |
|---|---|---|---|---|
| 10,406,671 | B2 | 9/2019 | Karmatz | |
| 2012/0074006 | A1* | 3/2012 | Monaco | H04M 1/15 206/320 |
| 2019/0281961 | A1* | 9/2019 | Peterson | A45F 5/00 |

\* cited by examiner

*Primary Examiner* — Hsinchun Liao
(74) *Attorney, Agent, or Firm* — Paul M. Sykes; Jessica L. Zurlo; Bradley Arant Boult Cummings LLP (57) ABSTRACT

A grip and support accessory for attachment to a mobile phone or other electronic device is provided. The accessory assists a user in maintaining a grip on a handheld device and may also be used as a stand to support the handheld device in a vertical or horizontal viewing orientation for hands-free viewing. The accessory includes a base configured for attachment to the handheld device, a grip movably attached to the base, and an arm operably attached to the base and the grip, where the arm is operable to move the grip from a closed position to multiple extended positions.

21 Claims, 11 Drawing Sheets

GRIP AND SUPPORT ATTACHMENT FOR HANDHELD ELECTRONIC DEVICES

FIELD OF THE DISCLOSURE

The present disclosure relates generally to accessories for handheld electronic devices, and more particularly to a grip and support device for attachment to a mobile phone or other electronic device.

BACKGROUND

Portable electronic devices are increasingly being used for multiple tasks ranging from audio and video telephony to navigation to computing to electronic books to video and audio entertainment to exercise. During these activities, it can be difficult for users to maintain their grip on the portable electronic device, especially with larger devices and in single-handed modes of use, such as taking pictures or "selfies." Damage caused by dropping a portable electronic device can be expensive and time consuming to replace. Additionally, with the increasing popularity of television and movie streaming services, users have a desire to watch video entertainment on their portable electronic devices without having to hold or grip the device. While there are a number of grip and stand attachments currently on the market, these attachments are often bulky or require the user to spread their fingers in an uncomfortable position to engage the grip. Moreover, the grip mechanisms currently in use often require either landscape or portrait viewing. This limits versatility and usability.

Accordingly, there remains a need in the art for an improved device that can assist a user in securely holding a handheld electronic device, while also providing hands-free viewing in either the landscape or portrait orientation.

SUMMARY

Grip and support attachments for handheld electronic devices are disclosed. The grip and support attachments of the present disclosure allow for a user to securely hold the handheld electronic device, while also providing for hands-free viewing in both the landscape and portrait orientations. In some embodiments, a grip and support attachment for a handheld electronic device is provided, the grip and support attachment including a base configured for attachment to the handheld electronic device, a grip movably attached to the base, an arm operably attached to the base and the grip, wherein the arm is operable to move the grip from a closed position in which the grip is substantially flat against the base to an extended position in which an opening is defined between the base and the grip for use in gripping the handheld electronic device, and wherein the grip includes an outer surface forming a tapered curvature.

In this embodiment, the grip and support attachment may further include a securing element for attaching the base to the handheld electronic device. The securing element may include an adhesive for attachment to the base. In another embodiment, the arm is cylindrically shaped and has a tapered cross section. The arm can be pivotally and rotatably attached to the base and the grip by an interference fit. In still another embodiment, the grip is substantially U-shaped and forms a cutout for storing the arm when the grip is in the closed position.

In other embodiments, a grip and support attachment for a handheld electronic device is provided, the grip and support attachment including a base configured for attachment to the handheld electronic device, wherein the base includes an upper section and a lower section; a securing element, such as an adhesive, for attaching the base to the handheld electronic device; an arm having a first end and a second end, wherein the first end is operably attached to the lower section of the base at a first connection point, a grip operably attached to the second end of the arm at a second connection point, wherein the grip is rotatable about the second connection point, wherein the arm enables pivotal movement of the grip between a closed position, in which the grip is substantially flat against the upper section of the base and flush with the lower section of the base, and at least one of: a first extended position in which an opening is defined between the base and the grip for gripping the handheld electronic device, and a second extended position in which the grip is engaged with the base for supporting the handheld electronic device in at least one of a horizontally oriented position and a vertically oriented position. In one embodiment, the first end and the second end are operably attached at the first connection point and the second connection point by an interference fit.

In some embodiments, in the closed position, the base and the grip form an outer surface having a tapered curvature. In another embodiment, the grip includes a support surface having a curved outer corner, the curved outer corner configured to form a notch between the grip and the lower section when in the closed position. In still another embodiment, the arm is cylindrically shaped and has a tapered cross section, the tapered cross section having a first thickness at each of the first and second ends and a second thickness at a center point, wherein the second thickness is less than the first thickness. In yet another embodiment, the grip is rotatable up to about 270 degrees about the second connection point. The upper section of the base may also include a slot configured for engagement with the grip when in the second extended position.

In still other embodiments, a grip and support attachment for a handheld electronic device is provided, the grip and support attachment including a base configured for attachment to the handheld electronic device, wherein the base includes an upper section and a lower section, the upper section including a fitting; a securing element for attaching the base to the handheld electronic device; an arm having a first end and a second end, wherein the first end is pivotally and rotatably attached to the lower section of the base at a first connection point, a grip pivotally and rotatably attached to the second end of the arm at a second connection point, wherein the grip is rotatable about the second connection point, wherein the grip and the lower section each include a tapered cross section, wherein the arm enables pivotal movement of the grip between a closed position, in which the grip is substantially flat against the upper section of the base and flush with the lower section of the base, and at least one of: a first extended position in which the grip is pivoted away from the base to form an opening defined between the base and the grip for gripping the handheld electronic device, and a second extended position in which the grip is engaged with the fitting for supporting the handheld electronic device in at least one of a horizontally oriented position and a vertically oriented position. In some embodiments, in the second extended position, the handheld electronic device can be positioned in either a landscape orientation or a portrait orientation without having to change the positioning of the grip.

In one embodiment, the grip includes an overhang configured to extend past an upper edge of the upper section. In this embodiment, in the closed position, a pinch point is formed between the grip and the lower section of the base to offset mechanical force applied under the overhang. In another embodiment, the grip is movable between the closed position and the at least one of the first extended position and the second extended position without the use of a biasing means. In still another embodiment, the first end and the second end are pivotally and rotatably attached at the first connection point and the second connection point by an interference fit.

In other embodiments, a grip and support attachment for a handheld electronic device is provided, including a base configured for attachment to the handheld electronic device, the base including a substantially flat upper section and a lower section including a first surface substantially perpendicular to said upper section, a grip including a substantially flat lower surface and a support surface substantially perpendicular to said lower surface, said support surface meeting said lower surface at a beveled edge; an arm pivotally attached to the base at a lower connection and pivotally attached to the grip at an upper connection, wherein the arm is operable to move the grip arcuately between an extended position in which an opening is defined between the base and the grip for use in gripping the handheld electronic device and a closed position in which the lower surface of the grip is substantially flat against the upper section of the base and the support surface of the grip abuts the first surface of the base such that upon pivoting of said arm away from the base about said lower connection the support surface impinges upon the first surface. In one embodiment, when the grip is in the closed position, the bevel permits pivoting of said grip away from the base about the upper connection.

BRIEF DESCRIPTION OF THE DRAWINGS

Further features and advantages can be ascertained from the following detailed description that is provided in connection with the drawings described below.

DETAILED DESCRIPTION

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

Spatially relative terms, such as "under," "below," "lower," "over," "upper," and the like, may be used herein for ease of description to describe one element or feature's relationship to another when the apparatus is right side up as shown in the accompanying drawings.

The terms "first," "second," "third," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Figure 1A:
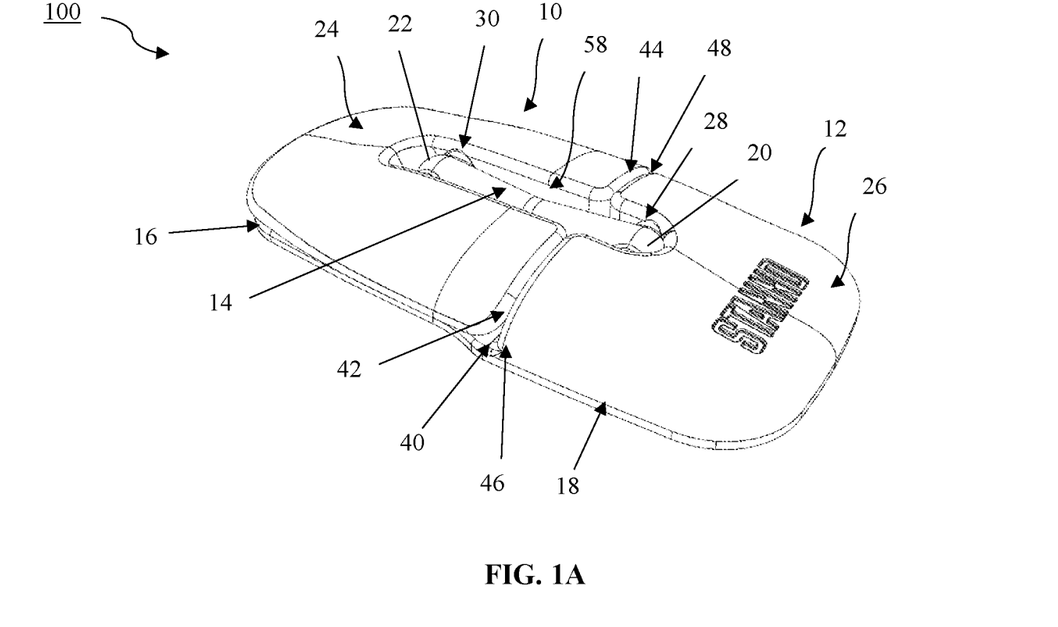
FIG. 1A is a front perspective view of a grip and support accessory in a closed position according to an embodiment of the present disclosure shown.
Figure 1B:
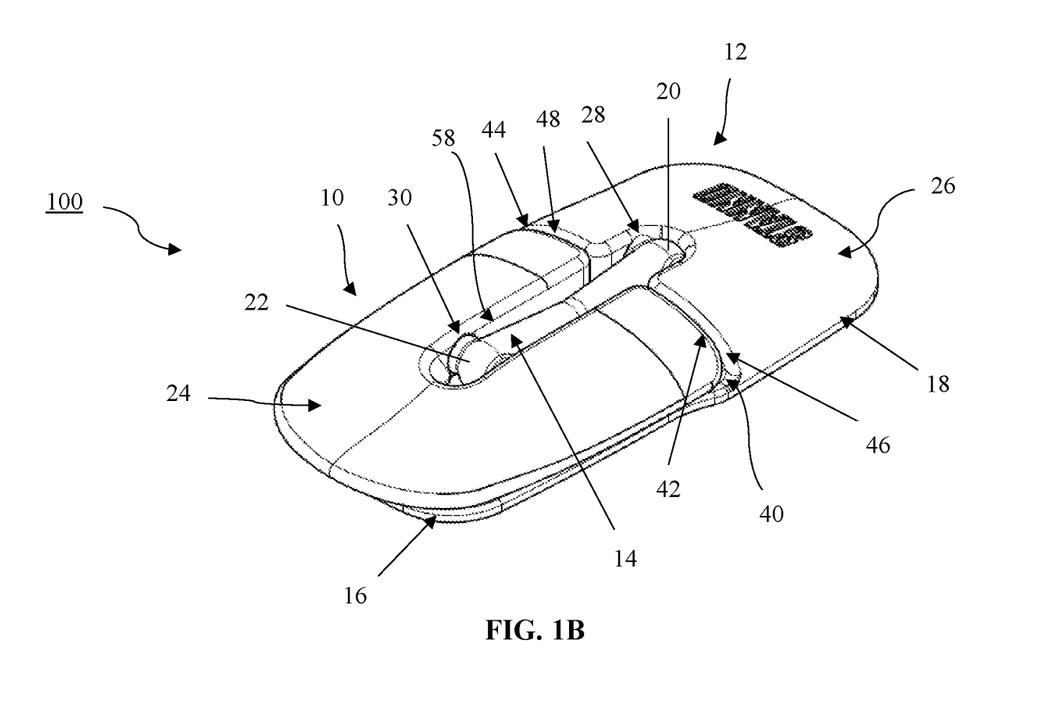
FIG. 1B is an isometric view of the grip and support accessory in the closed position.

Referring to FIGS. 1A and 1B, a grip and support accessory 100 according to an exemplary embodiment of the present disclosure is shown in a closed position. The grip and support accessory 100 includes a grip element 10 attached to a base 12. The base 12 may be mounted to a back surface of the handheld electronic device (not shown). The grip element 10 assists a user in maintaining the user's grip on the handheld electronic device and may also be used as a stand to support the handheld device in a vertical or horizontal viewing orientation for hands-free viewing.

In one embodiment, the base 12 has an upper section 16 and a lower section 18. The upper section 16 is substantially flat and integrally formed with the lower section 18. The lower section 18 has an outer surface 26 that is substantially curved. The grip element 10 has an inner surface (not shown) that is substantially flat and an outer surface 24 that is also substantially curved. As shown in FIGS. 1A and 1B, in the closed position, the grip element 10 is aligned with or substantially flat against the upper section 16 of the base 12 such that the grip element 10 sits flush with the lower section 18 of the base 12. In this closed position, the outer surface 24 of the grip element 10 and the outer surface 26 of the lower section 18 form a tapered curvature. This curvature advantageously reduces the footprint of the grip and support accessory 100 and allows the grip and support accessory 100 (when attached to a handheld device) to easily slide in and out of storage, for instance, in and out of a user's pocket, without interference. In this embodiment, the outer surfaces 24, 26 may be smooth to aid in storing the grip and support accessory 100. In another embodiment, the outer surfaces 24, 26 may be textured.

The grip element 10 is movably coupled to the base 12. The grip element 10 is movably coupled to the base 12 by an arm 14. The arm 14 has a first end 20 and a second end 22. The first end 20 is pivotally and rotatably attached to the lower section 18 of the base 12 at a first connection point 28. The second end 22 is pivotally and rotatably attached to the grip element 10 at a second connection point 30.

In one embodiment, the first connection point 28 and the second connection point 30 may each be in a recess fitted for receiving an end of the arm 14. For instance, the first end 20 and the second end 22 of the arm 14 may be T-shaped and sized to fit within the recesses of each connection point 28, 30. In one embodiment, the first end 20 and the second end 22 of the arm 14 may be attached at the respective connection points 28, 30 by an interference fit. In another embodiment, the first end 20 and the second end 22 of the arm 14 may be attached at the respective connection points 28, 30 by a snap-fit. In still another embodiment, the first end 20 and the second end 22 of the arm 14 may be attached at the respective connection points 28, 30 by a securing means, such as by a screw, pin, fastener, or rivet. However, as will be apparent to one of ordinary skill in the art, the means by which the first end 20 and the second end 22 are attached at the respective connection points 28, 30 should not interfere with the pivotal and rotational movement provided by the arm 14.

As shown in FIGS. 1A and 1B, the grip element 10 and the lower section 18 of the base 12 include a cutout 58 for storing the arm 14 when in the closed position. The cutout 58 extends from the first connection point 28 on the lower section 18 to the second connection point 30 on the grip element 10. The arm 14 can sit flush within the cutout 58 when in the closed position. In the illustrated embodiment, the grip element 10 and the lower section 18 of the base 12 are generally U-shaped with the cutout 58 defined between the legs of the U-shape. However, the grip element 10 and the lower section 18 of the base 12 may alternatively be a wide variety of shapes or designs so long as the shape or design defines a cutout for storage of the arm 14. For instance, the grip element 10 and the lower section 18 of the base 12 may be round, disk shape, square, rounded square, rectangular, triangular, oval, elliptical, or hour-glass. The shape can also be formed as an ornament or specialty shape. Alternatively, ornamental designs can be added to the shape with markings or engraving.

The grip element 10 may have a support surface that can be engaged when the grip element 10 is positioned as a stand. In one embodiment, the grip element 10 has a first support surface 42 and a second support surface 44 that allow for the grip element 10 to serve as a stand when in an extended position. For instance, the first support surface 42 is the left bottom surface or the left "foot" of the U-shape and the second support surface 44 is the right bottom surface or the right "foot" of the U-shape. In the closed position, the first support surface 42 sits flush with a first upper edge 46 of the lower section 18 and the second support surface 44 sits flush with a second upper edge 48 of the lower section 18. In one embodiment, the first support surface 42 and the second support surface 44 are substantially flat to prevent the grip element 10 from sliding or moving during use. In another embodiment, the first support surface 42 and the second support surface 44 may be curved. While the illustrated embodiment shows the use of two support surfaces, it will be apparent to one of ordinary skill in the art that the grip element 10 may include a single support surface or more than two support surfaces depending on the desired shape of the grip element 10.

In one embodiment, to assist a user in opening the grip element 10 when in the closed position, a notch 40 may be formed where each of the first and second support surfaces 42, 44 meet the first and second upper edges 46, 48 of the lower section 18. For example, the first and second support surfaces 42, 44 may each include a curved outer corner such that the outer corners of the first and second support surfaces 42, 44 do not directly abut the outer corners of the first and second upper edges 46, 48. The notch 40 allows a user to insert a small object, such as a fingernail, under the grip element 10 to release it from the closed position. Once the grip element 10 is released from the closed position, it can be adjusted to the desired extended position.

In another embodiment, while the inner surface (not shown) of the grip element 10 lies substantially flat against the upper section 16 in the closed position, a gap may be created between the outer edges of the grip element 10 and the outer edges of the upper section 16. For example, a gap of about 1 mm to about 4 mm may be formed between the outer edges of the grip element 10 and the outer edges of the upper section 16 when in the closed position. In another embodiment, a gap of about 1.5 mm to about 3.5 mm may be formed between the outer edges of the grip element 10 and the outer edges of the upper section 16 when in the closed position. In still another embodiment, a gap of about 2 mm to about 3 mm may be formed between the outer edges of the grip element 10 and the outer edges of the upper section 16 when in the closed position. The gap can assist a user in releasing the grip element 10, for instance, by inserting a fingernail under the grip element 10.

Figure 2A:
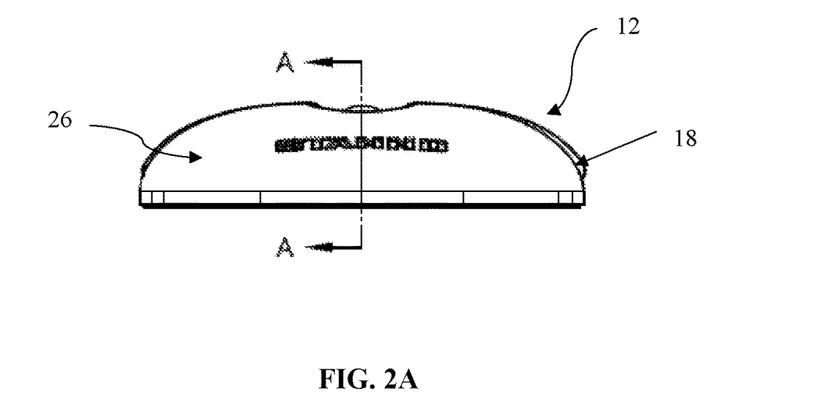
FIG. 2A is a front view of the grip and support accessory in the closed position.
Figure 2B:
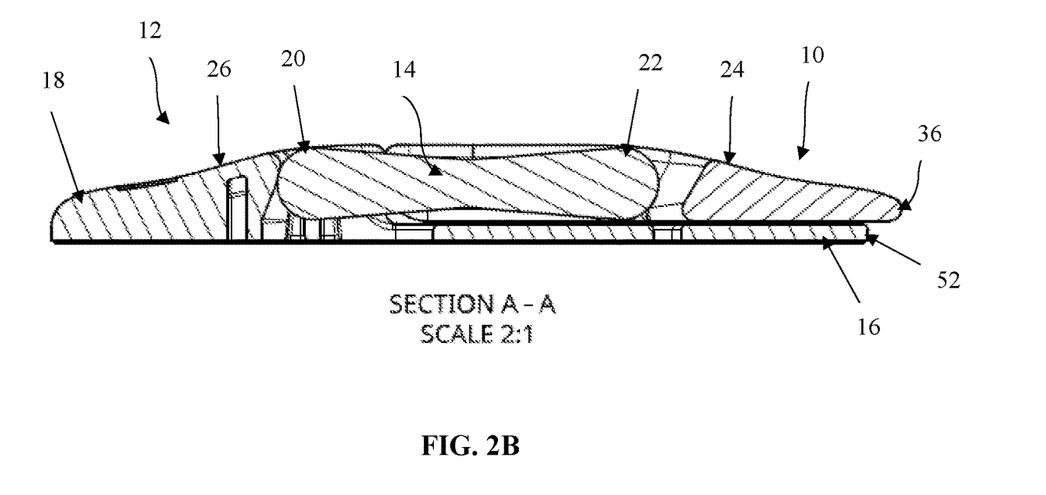
FIG. 2B is a cross sectional view of the grip and support accessory illustrated in FIG. 2A taken along the line "A-A."

FIG. 2A is a front view of the grip and support accessory 100 in the closed position. FIG. 2B is a cross sectional view of the grip and support accessory 100 illustrated in FIG. 2A taken along the line "A-A." As can be seen in FIG. 2B, the thickness of the grip element 10 and the lower section 18 of the base 12 is tapered along the cross section of the grip and support accessory 100. For instance, in the illustrated embodiment, the thickness of the grip element 10 and the lower section 18 at each of its innermost edges is greater than the thickness of each of the grip element 10 and the lower section 18 at its outermost edges (for example, at the ends of the grip and support accessory 100). In one embodiment, the grip element 10 and the lower section 18 may have a cross sectional thickness ranging from about 4 mm to about 10 mm. For example, to maintain a tapered cross section, the grip element 10 and the lower section 18 may have a thickness of up to about 10 mm at each of its innermost edges and a thickness as low as about 3 mm at each of its outermost edges. In another embodiment, the grip element 10 and the lower section 18 may have a thickness ranging from about 4 mm to about 9 mm. In still another embodiment, the grip element 10 and the lower section 18 may have a thickness ranging from about 5 mm to about 8 mm.

FIG. 2B also shows the cross section of the arm 14. In the illustrated embodiment, the arm 14 has a generally cylindrical shape. The arm 14 may have a tapered cross section. As shown in FIG. 2B, the thickness of the arm 14 at each of the first end 20 and the second end 22 is greater than the thickness at the center of the arm 14. The decreased thickness at the center of the arm 14 allows for a more secure grip. In another embodiment, the cross section of the arm 14 may have a uniform thickness. The cylindrical shape of the arm 14 also enables the user to hold the grip and support accessory 100 at any desired angle. The arm 14 may further include additional features to facilitate easy use and gripping by a user. For example, the arm 14 may include a ribbed gripping surface or may be coated in rubber or other plastic material for easy gripping.

The arm 14 may have a cross sectional thickness ranging from about 2 mm to about 6 mm. For instance, if the arm 14 has a tapered cross section, each of the first end 20 and the second end 22 may have a thickness of up to about 6 mm, while the center of the arm 14 may have any thickness greater than about 2 mm and less than the thickness of the first end 20 and the second end 22. In another embodiment, the arm 14 may have a cross sectional thickness ranging from about 2 mm to about 5 mm. In still another embodiment, the arm 14 may have a cross sectional thickness ranging from about 3 mm to about 4 mm.

Further details of the structure of the grip element 10 are also shown in FIG. 2B. The grip element 10 may optionally include a ledge or overhang 36 that extends past an upper edge 52 of the upper section 16 of the base 12. In one embodiment, the overhang 36 may extend about 0.5 mm to about 5 mm past the upper edge 52. In another embodiment, the overhang 36 may extend about 1 mm to about 4 mm past the upper edge 52. In still another embodiment, the overhang 36 may extend about 2 mm to about 3 mm past the upper edge 52. The overhang 36 is designed to aid a user in opening the grip element 10, as will be discussed in more detail below.

Figure 3:
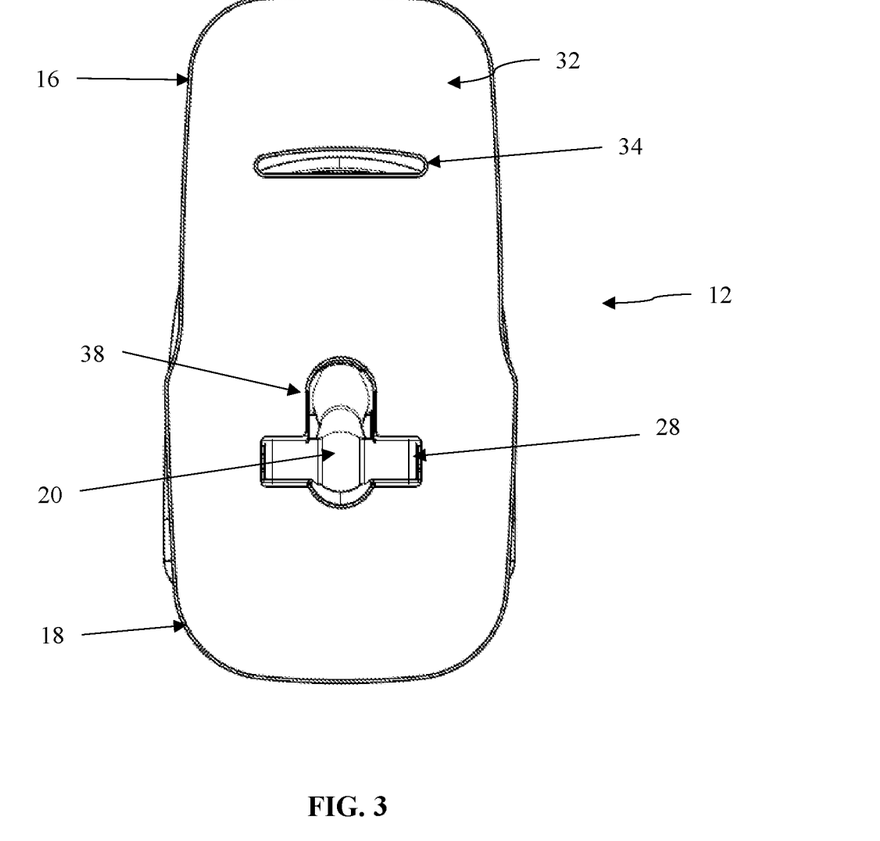
FIG. 3 is a bottom view of the grip and support accessory.

FIG. 3 is a bottom view of the grip and support accessory 100. More particularly, FIG. 3 shows the bottom surface 32 of the upper section 16 and the lower section 18 of the base 12. In the illustrated embodiment, the upper section 16 and the lower section 18 are integrally formed such that the bottom surface 32 is a single, unitary piece. However, in other embodiments, the upper section 16 and the lower section 18 may be formed as separate components, and thus, may have more than one bottom surface. The bottom surface 32 is substantially flat so that it may be attached to a back panel of a handheld electronic device, such as a mobile phone, or to a back panel of a protective or ornamental case installed on the electronic device.

The bottom view shown in FIG. 3 illustrates a slot 34 in the base 12. The slot 34 is positioned in the upper section 16 of the base 12. In one embodiment, the slot 34 is shaped as an elongated oval and is configured for receiving an upper edge of the grip element 10 (for example, the overhang 36 of the grip element 10) when the grip element 10 is in an extended position, as will be discussed in more detail below. In this aspect, the slot 34 should be sufficiently sized and dimensioned to allow for an upper edge of the grip element 10 to be inserted therein. While the illustrated embodiment shows the slot 34 in the upper section 16, one of ordinary skill in the art will appreciate that the upper section 16 may include a variety of other types of fittings for receiving the grip element 10 (for example, a groove, opening, or notch). In addition, while the illustrated embodiment shows a single slot 34, it will be apparent to one of ordinary skill in the art that any number of slots or fittings may be used in the upper section 16. For instance, the upper section 16 may include a plurality of slots or fittings so that the grip element 10 may be adjusted to differing heights when in the extended position.

The base portion may include a T-shaped cutout 38. The T-shaped cutout 38 is positioned in the lower section 18 of base 12 at the first connection point 28. As can be seen through the T-shaped cutout 38, the first connection point 28 includes a recess for receiving the first end 20 of the arm 14. The first end 20 is pivotally and rotatably attached at the first connection point 28 and allows for the arm 14 to move the grip element 10 between the closed position and multiple extended positions. In one embodiment, the T-shaped cutout 38 may be used as an opening to remove or replace the first end 20 of the arm 14 in case of damage.

As briefly described above, the grip element 10 is movable between the closed position, as shown in FIG. 1, and multiple extended positions that allows the user to utilize the grip and support accessory 100 as both a grip and a stand. When in the closed position, the grip element 10 is biased to remain closed until external forces act upon the grip element 10 to open it. Advantageously, the grip element 10 is designed to remain closed without the use of a biasing member, such as a spring or magnet.

In one embodiment, the grip element 10 may be opened by pressing and sliding down on the outer surface 24 of the overhang 36. The pressure applied against the outer surface 24 of the overhang 36 causes the first and second support surfaces 42, 44 of the grip element 10 to extend upward such that a user can grasp the grip element 10 and adjust it to the desired extended position. To prevent the grip element 10 from unintentionally opening if an external force catches the overhang 36 or applies pressure under the overhang 36, a pinch point is created in the spatial boundary where the first and second support surfaces 42, 44 of the grip element 10 abut the first and second upper edges 46, 48 of the lower section 18. In this embodiment, if pressure is applied against the underside of the overhang 36 or the arm is otherwise pivoted away from the base about the first connection point 28, the first and second support surfaces 42, 44 of the grip element 10 impinge upon or effectively "pinch" the first and second upper edges 46, 48 of the lower section 18 preventing the grip element 10 from opening. As shown for example in FIGS. 5A-5B, the first and second support surfaces 42, 44 of the grip element 10 may meet its inner surface 54 at a beveled or curved edge. As a result, when the grip element 10 is in a closed position, and force is applied to the top of the overhang 36 (that is, towards the base 12), the beveled edge allows the grip element 10 to pivot about the second connection point 20 and out of the closed position.

In another embodiment, while the overhang 36 is designed to prevent an unintentional opening of the grip element 10, a user can open the grip element 10 by applying a force under the overhang 36 sufficient to overcome the pinch point described above. In this embodiment, if sufficient force is applied under the overhang 36 to overcome the pinch point, the first and second support surfaces 42, 44 will compress against the first and second upper edges 46, 48, which in turn allows the grip element 10 to pivot upwards such that a user can move the grip element 10 to the desired extended position.

In still another embodiment, the grip element 10 may be opened by applying a force under the notches 40 formed between the first and second support surfaces 42, 44 of the grip element 10 and the first and second upper edges 46, 48 of the lower section 18. As noted above, in one embodiment, the user may insert the tip of their fingernail within the notch 40 to release the grip element 10 from the closed position. In still another embodiment, the grip element 10 may be opened by applying a force anywhere under the outer edges of the grip element 10 (for instance, near the notches 40 or near the overhang 36). Once the grip element 10 is opened, it may be moved to different extended positions depending on how the user wishes to use the grip and support accessory 100, for instance, as a grip or a stand.

Figure 4A:
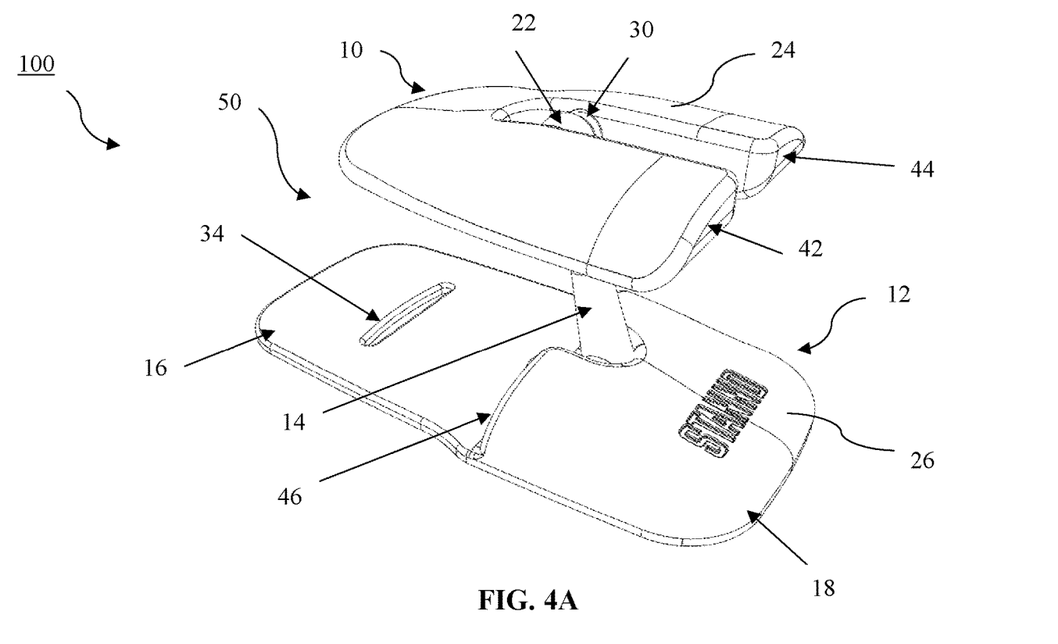
FIG. 4A is a front perspective view of the grip and support accessory in a first extended position.
Figure 4B:
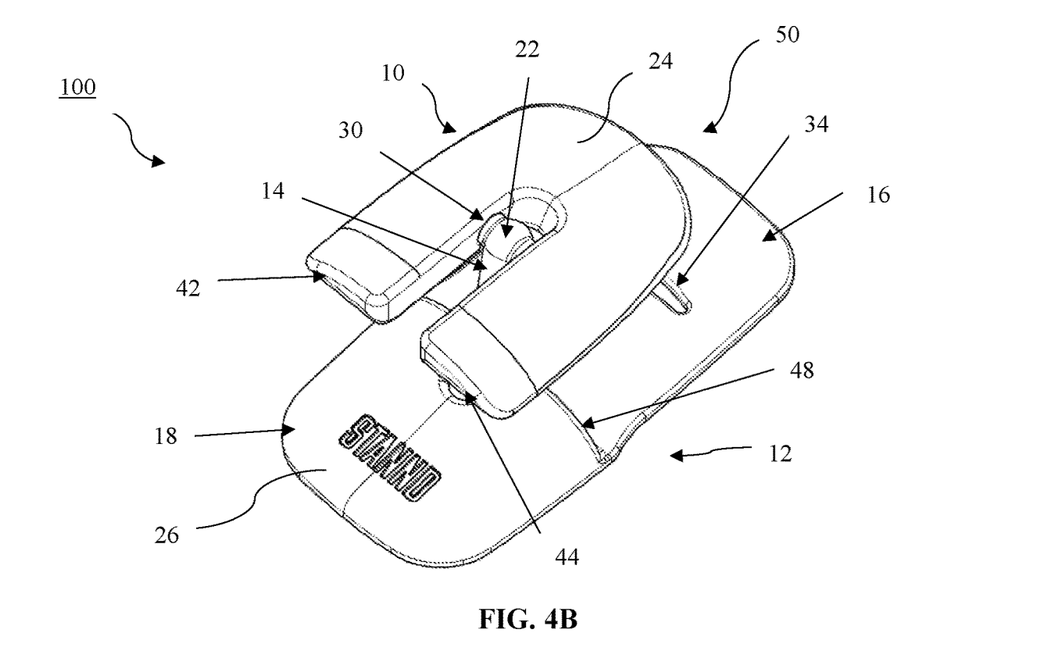
FIG. 4B is an isometric view of the grip and support accessory in the first extended position.

FIG. 4A is a perspective view of the grip and support accessory 100 in a first extended position and FIG. 4B is an isometric view of the grip and support accessory 100 in the first extended position. In one embodiment, when the grip and support accessory 100 is in the first extended position, it may be used as a grip. The arm 14 allows for the grip element 10 to move between the closed position, as shown in FIG. 1, and the first extended position, as shown in FIGS. 4A and 4B. In the first extended position, the arm 14 creates an opening 50 defined between the grip element 10 and the base 12. The arm 14 is configured to be grasped by a user to securely hold the grip and support accessory 100 and the attached handheld electronic device. For example, the user may insert one or more fingers through the opening 50 and around the arm 14 to securely hold the handheld electronic device, reducing the likelihood of dropping and damaging the electronic device.

Figure 5A:
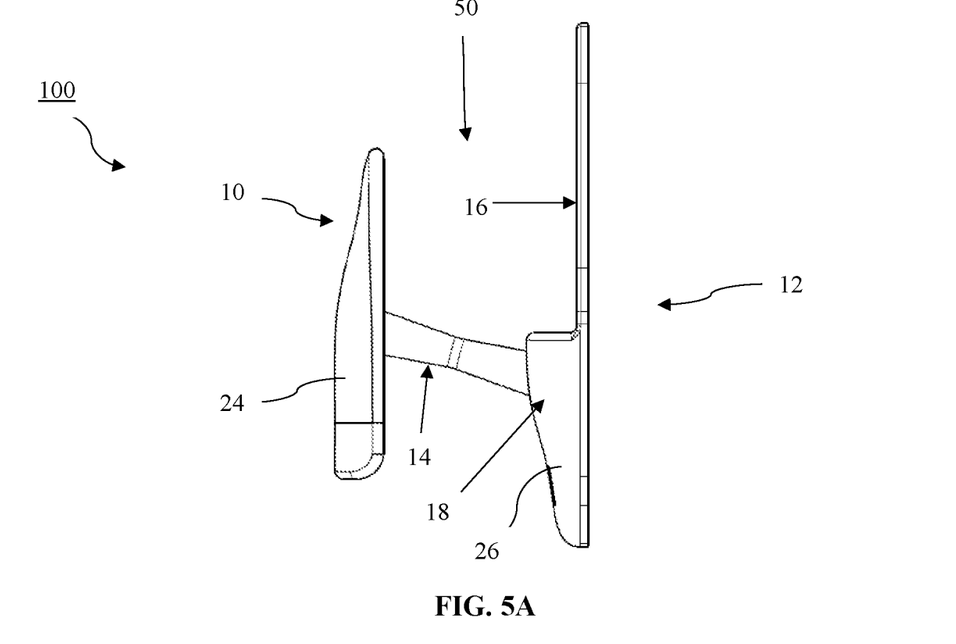
FIG. 5A is a side view of the grip and support accessory in the first extended position.

FIG. 5A is a side view of the grip and support accessory 100 in the first extended position. In one embodiment, the grip element 10 is pivotal between the closed position, where the grip element 10 lies substantially flat against the upper section 16 of the base 12, and the first extended position where the grip element 10 is pivoted away from the upper section 16 of the base 12, as shown in FIG. 5A. The grip element 10 can pivot between zero degrees, where the grip element 10 is aligned with or substantially flat against the upper section 16 of the base 12, and a fully extended position, where the grip element 10 is rotated up and away from the closed position such that the grip element 10 is positioned substantially parallel to the base 12. In another embodiment, the grip element 10 can have a plurality of positions between zero degrees and its fully extended position, depending on the user's desired preference. For instance, the user may extend the grip element 10 about halfway (i.e., between about between 35 and 45 degrees) if the user would like the opening 50 to be more compact.

In addition to the pivotal movement described above, the grip element 10 may be rotatable. In one embodiment, the grip element 10 is rotatable about the second connection point 30. For instance, when the grip element 10 is in the first extended position, the grip element 10 can rotate up to about 270 degrees about the second connection point 30. The grip element 10 can have a plurality of rotatable positions between zero degrees, which is defined as the position of the grip element 10 shown in FIG. 5A, and about 270 degrees. In one embodiment, the grip element 10 can be rotated about the second connection point 30 to an angle of about 180 degrees. In another embodiment, the grip element 10 can be rotated about the second connection point 30 to an angle of about 270 degrees.

Figure 5B:
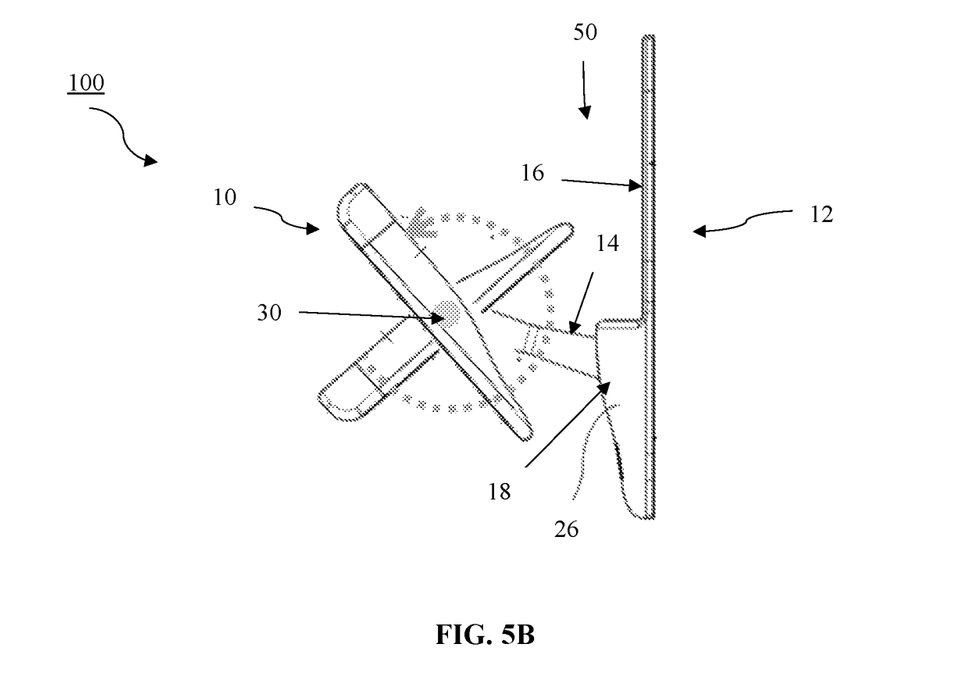
FIG. 5B is a side view of the grip and support accessory showing the movement of the grip element in the first extended position.

FIG. 5B is a side view of the grip and support accessory 100 showing the movement of the grip element 10 in the first extended position. The arrow in FIG. 5B shows the full range of rotation of the grip element 10 while in the first extended position. As shown in FIG. 5B, the grip element 10 can be rotated to a plurality of positions between the starting position shown in FIG. 5A and the fully rotated position shown in FIG. 5B. For instance, as shown in FIG. 5B, the grip element 10 can be rotated about the second connection point 30 up to an angle of about 270 degrees.

Figure 5C:
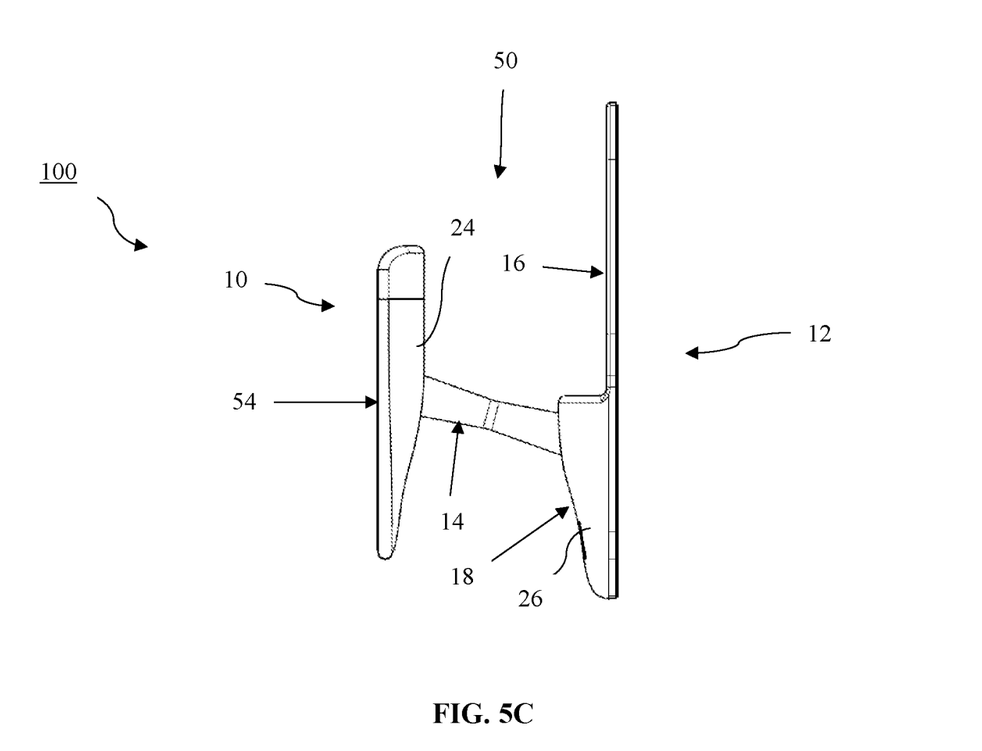
FIG. 5C is a side view of the grip and support accessory in the first extended position according to another embodiment of the present disclosure.

FIG. 5C is a side view of the grip and support accessory 100 in the first extended position where the grip element 10 is rotated. In the illustrated embodiment, the grip element 10 is rotated about the second connection point 30 to an angle of about 180 degrees from the starting position shown in FIG. 5A. The user can use the rotational movement to reposition the grip element 10 such that an inner surface 54 of the grip element 10 faces an outward direction and can be seen by the user when the grip element 10 is in the first extended position. In this embodiment, the inner surface 54 of the grip element 10 may have a decorative panel or material attached thereto, for instance, a logo, monogram, trademark, or design.

Figure 6:
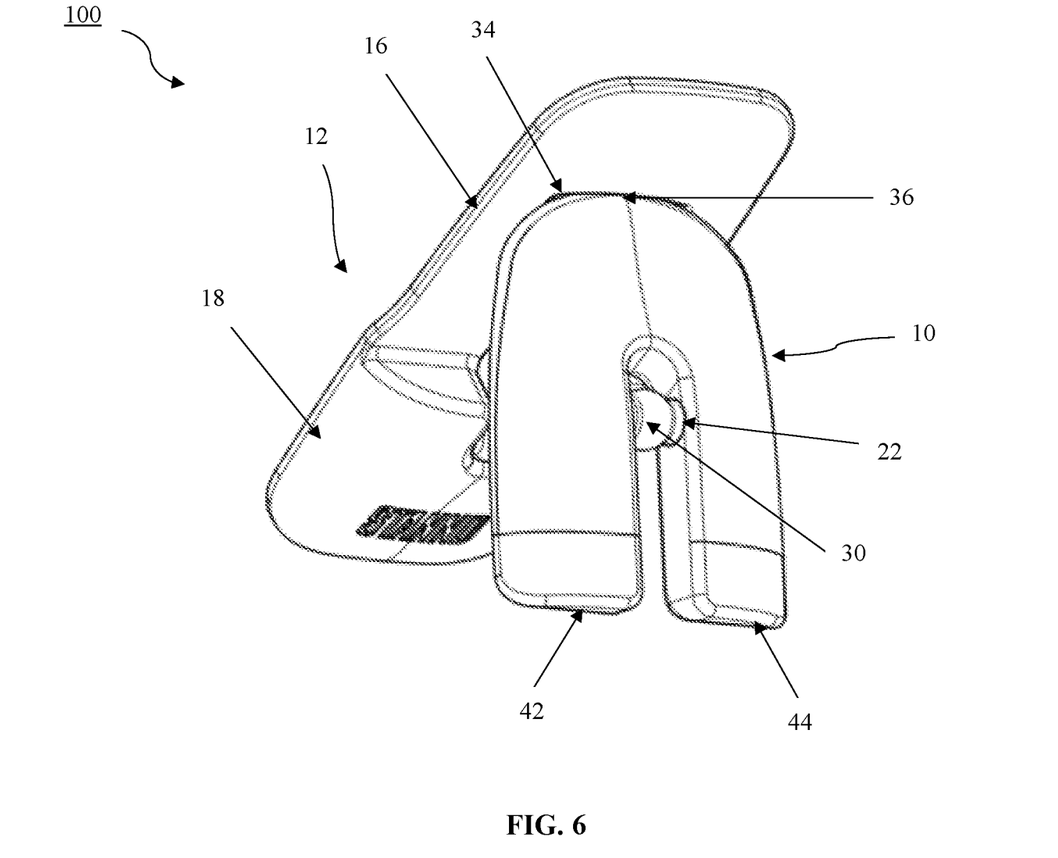
FIG. 6 is a perspective view of the grip and support accessory in a second extended position.

FIG. 6 is a perspective view of the grip and support accessory 100 in a second extended position. In one embodiment, when the grip and support accessory 100 is in the second extended position, it may be used as a stand. In this position, the grip element 10 may be used as a stand to position the handheld electronic device in a portrait or landscape viewing orientation for hands-free viewing, as will be discussed in more detail below.

As shown in FIG. 6, in the second extended position, the grip element 10 is in a substantially upright position and configured to support the base 12 at an angle so that the handheld electronic device when attached thereto may be positioned for hands-free viewing in a portrait orientation. The grip element 10 can be movable from the first extended position to the second extended position by the pivotal motion provided by the arm 14. In this embodiment, the grip element 10 is engaged with the upper section 16 of the base 12. For example, as illustrated, an upper portion of the grip element 10 is received within the slot 34. In one embodiment, the overhang 36 of the grip element 10 is received within the slot 34. When the grip element 10 is engaged with the slot 34, the first and second support surfaces 42, 44 of the grip element 10 can be placed on a surface, such as a table or desk, to support the handheld electronic device attached thereto.

Figure 10:
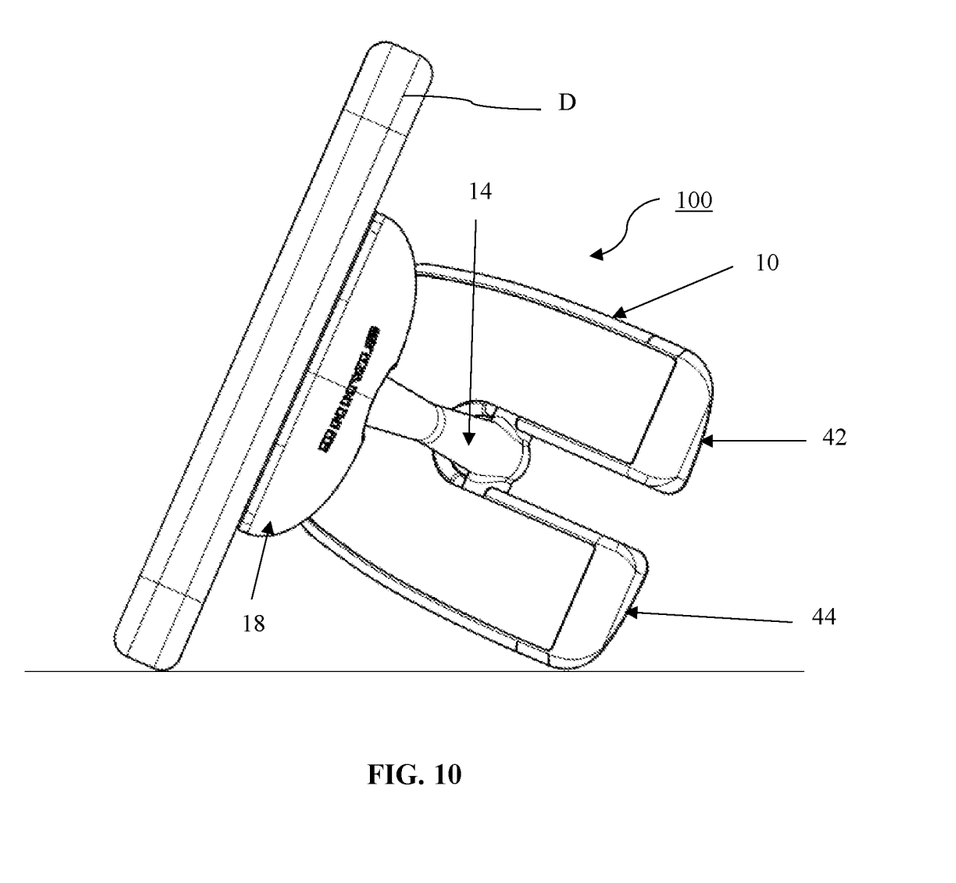
FIG. 10 is a side view of the grip and support accessory attached to the handheld electronic device and shown in the second extended position for landscape viewing.

While FIG. 6 shows the grip and support accessory 100 in a substantially upright position, the grip and support accessory 100 may be rotated about 90 degrees so that the handheld electronic device attached thereto may be positioned for hands-free viewing in a landscape orientation (shown in FIG. 10). In this embodiment, an edge of the grip element 10 (rather than the first and second support surfaces 42, 44) can be placed on a surface to support the handheld electronic device attached thereto. Advantageously, in this embodiment, the grip and support accessory 100 can be positioned in either a landscape orientation or a portrait orientation without having to change the angular positioning of the grip element 10.

Absent external forces acting on the grip element 10, the grip element 10 is biased to remain in the desired extended position (for instance, as a grip or stand). In some embodiments, the grip element 10 is biased to remain in the desired extended position due to the interference fit of the arm 14 at each of the respective connection points 28, 30. To overcome the bias and collapse the grip element 10 to the closed position, in one embodiment, the grip element 10 may be pressed down. For example, to move the grip element 10 from the first or second extended position to the closed position, the outer surface 24 of the grip element 10 may be pressed down such that the grip element 10 flattens against the base 12 (for example, the upper section 16 of the base 12). In one embodiment, the grip element 10 may be movable from the first extended position or the second extended position to the closed position by a snap closure.

Figure 7:
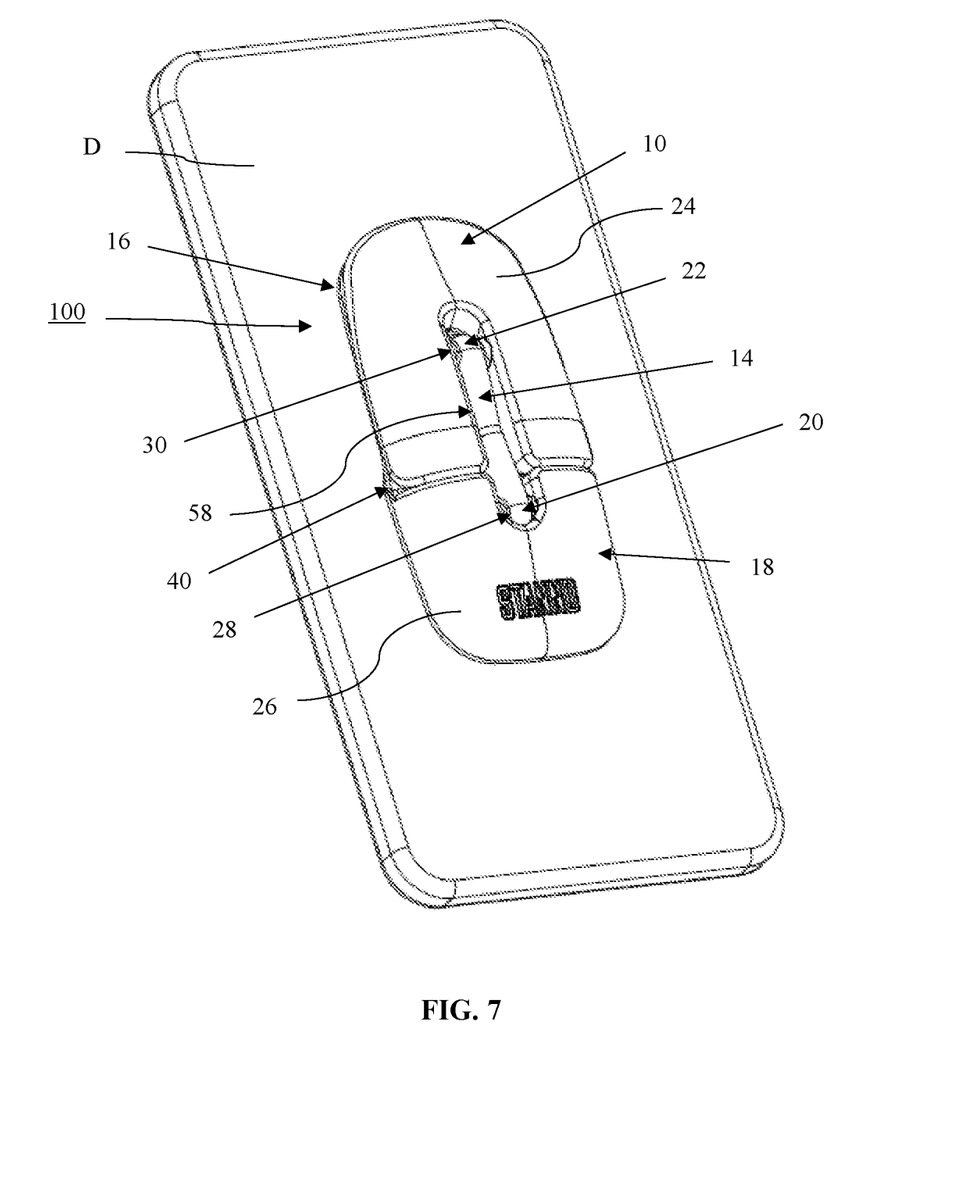
FIG. 7 is a perspective view of the grip and support accessory attached to a handheld electronic device and shown in the closed position.
Figure 8:
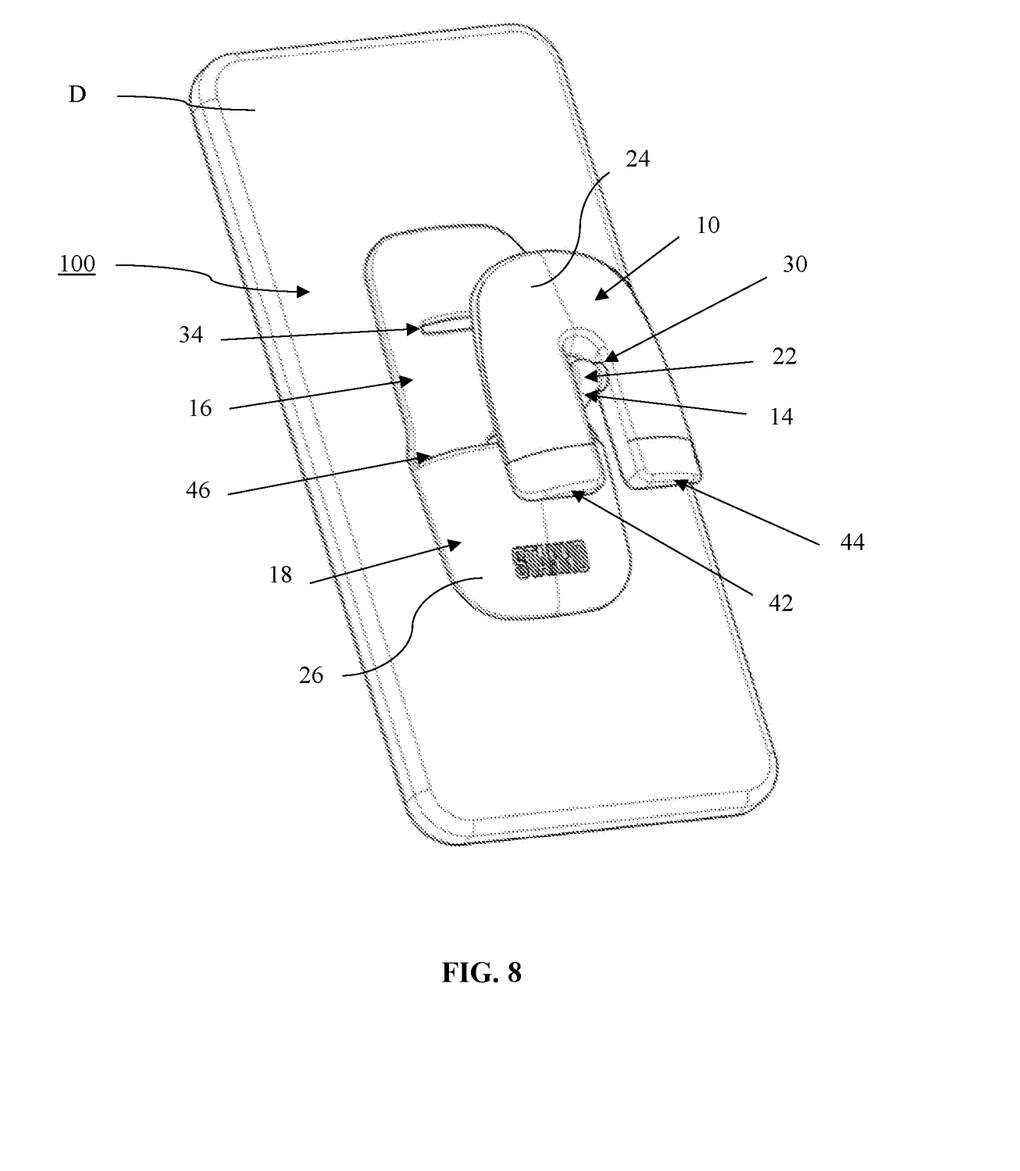
FIG. 8 is a perspective view of the grip and support accessory attached to the handheld electronic device and shown in the first extended position.

FIGS. 7 and 8 are perspective views of the grip and support accessory 100 attached to a handheld electronic device D. FIG. 7 shows the grip and support accessory 100 attached to the handheld electronic device D in a closed position, while FIG. 8 shows the grip and support accessory 100 attached to the handheld electronic device D in the first extended position (for example, as a grip). In the illustrated embodiments, the handheld electronic device D is a mobile phone. However, the handheld electronic device D may be, for instance, a tablet, tablet computer, electronic book reader, portable music player, portable video player, or personal digital assistant (PDA).

As briefly described above, the grip and support accessory 100 may be attached to a back panel of the handheld electronic device D or to a back panel of a protective or ornamental case installed on the handheld electronic device D. In one embodiment, to provide the most secure grip on the handheld electronic device D, the grip and support accessory 100 is positioned at the center of the back panel. However, as will be apparent to one of ordinary skill in the art, the grip and support accessory 100 can be positioned anywhere on the back panel of the handheld electronic device D or case depending on the user's preferences.

In one embodiment, the grip and support accessory 100 may be removably attached to the handheld electronic device D or case using removable securing elements, such as a removable adhesive (for example, double-sided tape or glue), magnet, snap fastener, suction device, rivets, mechanical fasteners, latches, hooks, friction fitting slots, or clips. A removable securing element allows a user to remove the grip and support accessory 100 when not in use or when certain wireless chargers require the removal of such accessories. In some embodiments, due to the thinness and lack of metal parts in the grip and support accessory 100, wireless charging can be performed while the grip and support accessory 100 is attached to the handheld electronic device D. In another embodiment, the grip and support accessory 100 may be attached to the electronic device or case using a permanent fastening means. For example, the grip and support accessory 100 may be built into a protective or ornamental case installed on the electronic device such that the base 12 and the case are a single, unitary component.

Figure 9:
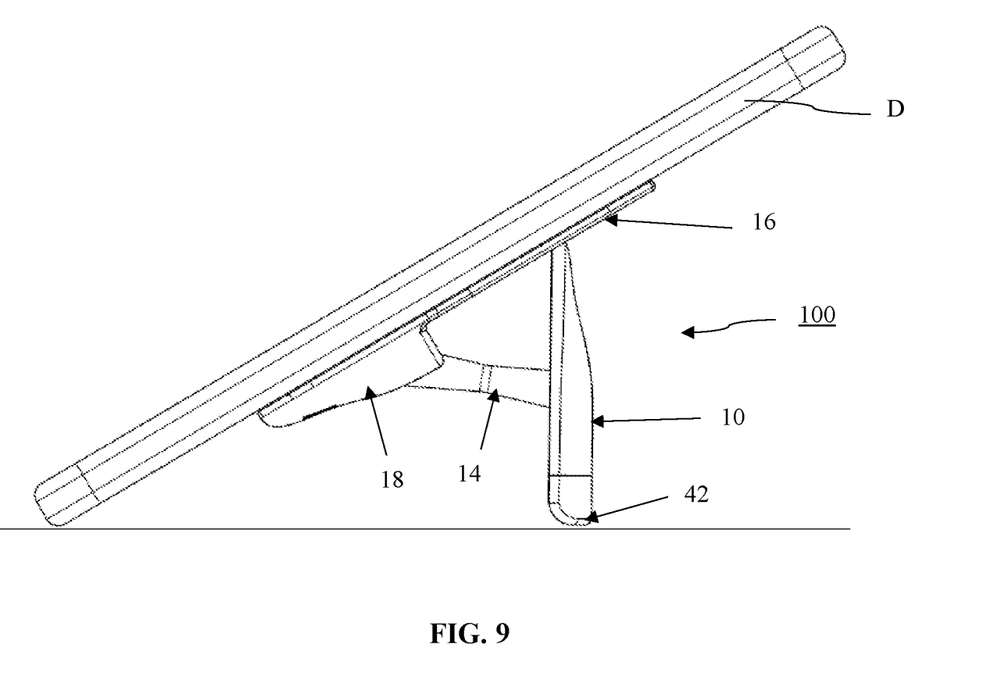
FIG. 9 is a side view of the grip and support accessory attached to the handheld electronic device and shown in the second extended position for portrait viewing.

FIGS. 9 and 10 are side views of the grip and support accessory 100 attached to the handheld electronic device D and shown in the second extended position. FIG. 9 shows the grip and support accessory 100 in the second extended position (for example, as a stand) when the handheld electronic device D is in a portrait orientation. In this embodiment, the grip element 10 can support the handheld electronic device D at an angle in the vertical position against a surface, such as a table or desk. In use as a stand in the portrait orientation, an edge of the handheld electronic device D and the first and second support surfaces 42, 44 of the grip element 10 rest against the surface. In the illustrated embodiment, the grip element 10 is positioned and dimensioned to support the handheld electronic device D in the portrait orientation.

FIG. 10 shows the grip and support accessory 100 in the second extended position (for example, as a stand) when the handheld electronic device D is in a landscape orientation. In this embodiment, the grip element 10 can support the handheld electronic device D at an angle in the horizontal position against the surface. In use as a stand in the landscape orientation, an edge of the handheld electronic device D and an edge of the grip element 10 rest against the surface. In the illustrated embodiment, the grip element 10 is positioned and dimensioned to support the handheld electronic device D in the landscape orientation.

The various components of the grip and support accessory 100 described herein may be constructed or manufactured from materials, such as various polymers, plastics, stainless steel, aluminum, and combinations thereof. Similarly, the various parts described herein may be constructed according to various manufacturing methods including injection molding, milling, forging, extrusion, pressing, 3D printing, and other related manufacturing methods.

The device described and claimed herein is not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

What is claimed is:

1. A grip and support attachment for a handheld electronic device, comprising:
   a base configured for attachment to the handheld electronic device,
   a grip movably attached to the base,
   an arm operably attached to the base and the grip, wherein the arm is operable to move the grip from a closed position in which the grip is substantially flat against the base to an extended position in which an opening is defined between the base and the grip for use in gripping the handheld electronic device,
   wherein the grip comprises an outer surface forming a tapered curvature, and
   wherein the grip is substantially U-shaped and forms a cutout for storing the arm when the grip is in the closed position.

2. The grip and support attachment of claim 1, further comprising a securing element for attaching the base to the handheld electronic device.

3. The grip and support attachment of claim 2, wherein the securing element comprises an adhesive.

4. The grip and support attachment of claim 1, wherein the arm is cylindrically shaped and has a tapered cross section.

5. The grip and support attachment of claim 1, wherein the arm is pivotally and rotatably attached to the base and the grip by an interference fit.

6. A grip and support attachment for a handheld electronic device, comprising:
   a base configured for attachment to the handheld electronic device, wherein the base comprises an upper section and a lower section;
   a securing element for attaching the base to the handheld electronic device;
   an arm having a first end and a second end, wherein the first end is operably attached to the lower section of the base at a first connection point, a grip operably attached to the second end of the arm at a second connection point, wherein the grip is rotatable about the second connection point, wherein the arm enables pivotal movement of the grip between a closed position, in which the grip is substantially flat against the upper section of the base and flush with the lower section of the base, and at least one of:

a first extended position in which an opening is defined between the base and the grip for gripping the handheld electronic device, and a second extended position in which the grip is engaged with the base for supporting the handheld electronic device in at least one of a horizontally oriented position and a vertically oriented position.

7. The grip and support attachment of claim 6, wherein the grip is rotatable up to about 270 degrees about the second connection point.

8. The grip and support attachment of claim 6, wherein the arm is cylindrically shaped and has a tapered cross section, the tapered cross section having a first thickness at each of the first and second ends and a second thickness at a center point, wherein the second thickness is less than the first thickness.

9. The grip and support attachment of claim 6, wherein the first end and the second end are operably attached at the first connection point and the second connection point by an interference fit.

10. The grip and support attachment of claim 6, wherein the securing element comprises an adhesive.

11. The grip and support attachment of claim 6, wherein the upper section of the base comprises a slot configured for engagement with the grip when in the second extended position.

12. The grip and support attachment of claim 6, wherein, in the closed position, the base and the grip form an outer surface having a tapered curvature.

13. The grip and support attachment of claim 6, wherein the grip comprises a support surface having a curved outer corner, the curved outer corner configured to form a notch between the grip and the lower section when in the closed position.

14. A grip and support attachment for a handheld electronic device, comprising:

a base configured for attachment to the handheld electronic device, wherein the base comprises an upper section and a lower section, the upper section comprising a fitting;

a securing element for attaching the base to the handheld electronic device;

an arm having a first end and a second end, wherein the first end is pivotally and rotatably attached to the lower section of the base at a first connection point, a grip pivotally and rotatably attached to the second end of the arm at a second connection point, wherein the grip is rotatable about the second connection point, wherein the grip and the lower section each comprise a tapered cross section, wherein the arm enables pivotal movement of the grip between a closed position, in which the grip is substantially flat against the upper section of the base and flush with the lower section of the base, and at least one of:

a first extended position in which the grip is pivoted away from the base to form an opening defined between the base and the grip for gripping the handheld electronic device, and a second extended position in which the grip is engaged with the fitting for supporting the handheld electronic device in at least one of a horizontally oriented position and a vertically oriented position.

15. The grip and support attachment of claim 14, wherein, in the second extended position, the handheld electronic device can be positioned in either a landscape orientation or a portrait orientation without having to change the positioning of the grip.

16. The grip and support attachment of claim 14, wherein the grip comprises an overhang configured to extend past an upper edge of the upper section.

17. The grip and support attachment of claim 16, wherein, in the closed position, a pinch point is formed between the grip and the lower section of the base to offset mechanical force applied under the overhang.

18. The grip and support attachment of claim 14, wherein the grip is movable between the closed position and the at least one of the first extended position and the second extended position without the use of a biasing means.

19. The grip and support attachment of claim 14, wherein the first end and the second end are pivotally and rotatably attached at the first connection point and the second connection point by an interference fit.

20. A grip and support attachment for a handheld electronic device, comprising:

a base configured for attachment to the handheld electronic device, the base comprising a substantially flat upper section and a lower section comprising a first surface substantially perpendicular to said upper section, a grip comprising a substantially flat lower surface and a support surface substantially perpendicular to said lower surface, said support surface meeting said lower surface at a beveled edge;

an arm pivotally attached to the base at a lower connection and pivotally attached to the grip at an upper connection, wherein the arm is operable to move the grip arcuately between an extended position in which an opening is defined between the base and the grip for use in gripping the handheld electronic device and a closed position in which the lower surface of the grip is substantially flat against the upper section of the base and the support surface of the grip abuts the first surface of the base such that upon pivoting of said arm away from the base about said lower connection the support surface impinges upon the first surface.

21. The grip and support attachment of claim 20, wherein when said grip is in the closed position the bevel permits pivoting of said grip away from the base about the upper connection.

* * * * *